Dec. 20, 1932.  R. W. LYTLE  1,891,823
SILENT GEAR
Original Filed Oct. 28, 1930
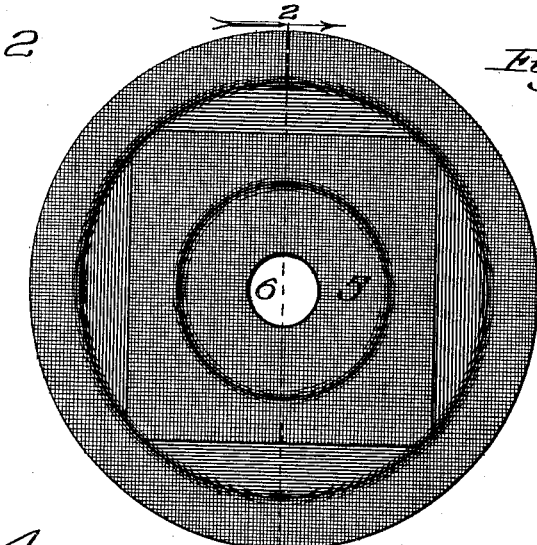
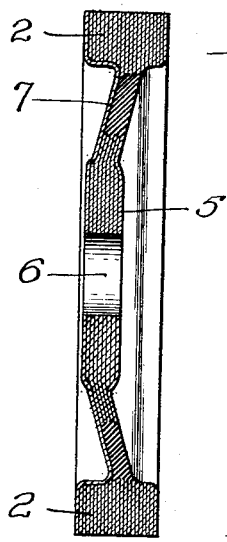
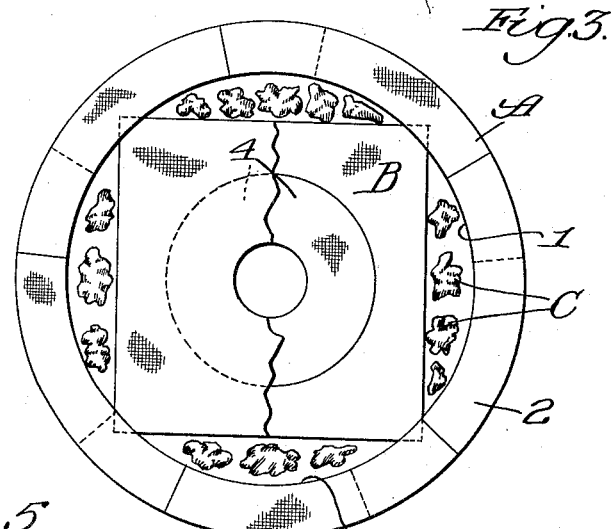
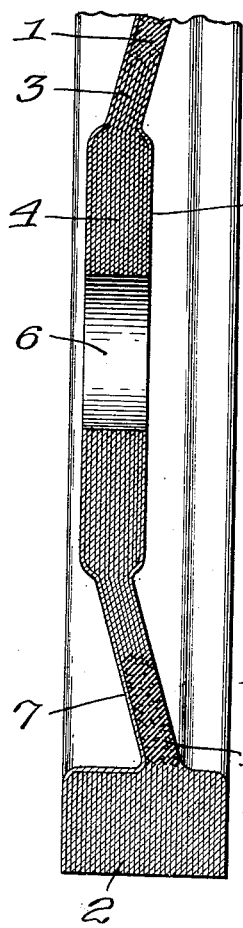
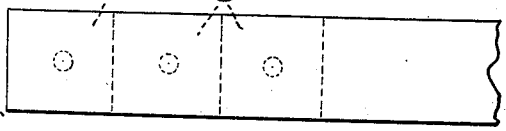
Inventor:
Robert W. Lytle,
By Dyrenforth, Lee, Chritton & Wiles,
Attys.

Patented Dec. 20, 1932

1,891,823

UNITED STATES PATENT OFFICE

ROBERT W. LYTLE, OF CINCINNATI, OHIO, ASSIGNOR TO THE FORMICA INSULATION COMPANY, OF CINCINNATI, OHIO, A CORPORATION OF OHIO

SILENT GEAR

Original application filed October 28, 1930, Serial No. 488,123. Divided and this application filed July 6, 1931. Serial No. 549,070.

This invention relates particularly to gear wheels of the silent gear type. Such gears are commonly made from a laminated product composed of cloth or canvas impregnated with a varnish of bakelite, redmanol, or the like, the mass being compacted and hardened under heat and pressure. Such a gear is expensive; and where the gear is formed by cutting blanks from a large, thick sheet of the laminated product referred to, one cannot economize in the use of materials.

Among laminated products of the character mentioned above which have been known on the market for years, may be mentioned formica and micarta.

Molded gear-blanks have heretofore been produced. One method which has enabled such a gear blank to be produced at moderate cost is a method in which an annulus comprising layers of cloth impregnated with a binder has been built up, and a web has been provided within the annulus, composed of a binder and macerated cloth, for example. Such a gear is unsatisfactory in some respects and does not possess as good strength as desired.

The primary object of the present invention is to provide an improved silent gear and an improved method of making the same. In the improved gear, use is made of a ring or annulus comprising layers of cloth impregnated with bakelite varnish, for example; a center-structure comprising layers of cloth impregnated with bakelite varnish, with spaces intervening between the center-structure and the annulus; and molding compound in the spaces between the center-structure and the rim or annulus. A structure, or assembly, of this character may be consolidated and hardened under heat and pressure in a suitable mold, and thus one may produce a gear blank having the requisite strength and effect a very material economy in the use of materials. In the molding operation, the heat converts the bakelite to an infusible and substantially insoluble condition.

The invention is illustrated in a preferred embodiment in the accompanying drawing, in which—

Fig. 1 is a plan view of the improved gear; Fig. 2, a section taken as indicated at line 2 of Fig. 1; Fig. 3, a plan view (partly broken) illustrating the manner in which the gear is built up; Fig. 4, an enlarged broken view which is sectional and somewhat diagrammatic in character; Fig. 5, a broken plan view illustrating the manner in which the polygonal sheets of the center-structure preferably are formed; and Fig. 6, a similar view illustrating a modification.

In the preferred practice, the assembly from which the gear-blank is molded is built up as follows: An annulus A and a center-structure B are built up from plies of duck impregnated with a potentially reactive phenolic condensation product varnish, such as bakelite, the shape of the plies of the center-structure being such as to provide spaces between the edges of the center-structure and the annulus, as indicated at 1; the spaces are then filled with a molding compound C comprising a suitable filler, such as wood flour and a binder, preferably a potentially reactive bakelite resin. The structure is introduced into a mold and molded under heavy pressure at a high temperature until the binder is transformed to an infusible and substantially insoluble condition. The manner in which this may be effected is now well understood in the art.

The fabric employed may be any suitable fabric, such as duck, canvas, paper or the like. Preferably, however, a good grade of duck is employed.

An important feature of the invention is that which enables the plies of material which are to be used in the structure to be obtained without large losses. In the ordinary manufacture of gears from impregnated cloth, there is a waste of in the neighborhood of 17%. Inasmuch as material of this character is necessarily rather expensive the cost of gears produced from impregnated cloth cut into disks, or from previously manufactured impregnated heavy sheets, is excessive.

According to the present invention, the annulus A may be formed in any desired manner. Preferably, however, it is built up of overlapping segments 2 which are stacked to the desired height to form the necessary rim-thickness. These segments may be punched from a strip of impregnated duck fed through a punch machine.

The center-structure B comprises a stack of plies of impregnated fabric 3 of polygonal form. Preferably these plies are of square form and have their corner-portions extending between the plies which form the annulus A. These squares preferably are supplemented by small impregnated fabric disks 4 which may be placed between or upon the squares and which serve to form a thickened hub-portion, as indicated at 5.

Fig. 5 illustrates the manner in which squares 3 may be punched from a strip of impregnated fabric. In the punching operation, holes 6 may be punched in the plies which form the center-structure, thus providing for the reception of a shaft in the finished gear.

Fig. 6 illustrates the manner in which triangular plies 3ª may be punched from a strip without substantial waste. The triangular plies may be substituted for the square plies, if desired. Preferably, however, the squares are used.

It appears from what has been stated that polygonal fabric plies having four sides or less may be employed and these may be punched from a strip or sheet without any considerable waste of material.

The molding compound employed for filling the spaces 1 may be any suitable molding compound. Preferably a molding compound composed of wood flour and a potentially reactive phenolic condensation product is employed; and preferably the potentially reactive binder of the molding compound is sufficiently far reacted before it is introduced to enable it to harden slightly in advance of the hardening of the binder in the fabric plies forming the rim-structure and center-structure.

The molding compound may be, for convenience, preliminarily compacted into small balls which may be readily introduced into the cavities, these balls of molding compound being of suitable size and number to afford the requisite amount of material in the cavities.

Preferably one or more complete disks 7 of impregnated fabric are employed at one side of the assembly from which the gear-blank is molded. This gives a certain continuity to the web-structure and rim-structure, the disk or disks 7 serving as a foundation for the rim-portion as well as the center-structure of the assembly.

In the molding operation, the molding compound is more plastic and more free to flow than are the impregnated plies of duck employed in the rim-structure and center-structure. Accordingly, the materials become properly equalized in the mold, and a gear-blank of perfectly circular rim is readily formed and there is no danger of warping or distortion.

The mold may be equipped with a center stud or arbor which will extend through the center perforations 6 of the plies of the center-structure and thus a bore adapted to receive a shaft will be formed in the finished gear-blank.

It is preferred, as indicated above, to have the molding compound of such nature that it will harden slightly in advance of the remainder of the structure, the purpose being to bridge the spaces between the edges of the center-structure and the rim, thus securing the best results.

The improved gear-blank may have teeth cut or milled therein in the usual manner. If desired, it may be used as a pulley, without being provided with teeth. Ordinarily, teeth are provided for positive transmission, gears of this character being used largely in automobiles at the present time.

It will be noted that the web-portion of the gear, that is, the portion within the rim-portion, consists of a combination of two types of material which may be molded and compacted, namely, the center-structure which comprises the impregnated fabric and the molding powder which is used to fill the spaces between the center-structure and the rim. Thus, the two different materials encircled by the rim-portion are possessed of different elasticity or resilience characteristics, tending to produce inequal frequencies of vibration and thereby neutralize high tone vibrations. This results in improving the silent quality of the gear in operation. The fabrics employed give the necessary strength; and the shapes and relation of the plies of fabric enable a gear of economical cross-section to be produced. The molding compound in the spaces between the center-structure and the rim-structure may perhaps have somewhat of a cushioning effect. Chiefly, however, the improved silent quality of the gear is attributed by me to the differences in texture or composition which exist between the fabric portions and the bodies formed from the molding compound C.

The improved gear claimed herein may be manufactured advantageously by means of the process described and claimed in my pending application Serial No. 488,123, filed October 28, 1930, of which the present application is a division.

What I regard as new, and desire to secure by Letters Patent, is:

1. A gear as specified in claim 5, in which the center-structure comprises polygonal sheets, each having not more than four edges.

2. A gear as specified in claim 5, in which the center-structure comprises polygonal layers of fabric whose corners interlap with the layers of the annulus.

3. A gear comprising a circular disk of fabric impregnated with a binder, an annulus comprising layers of fabric superposed on the marginal portion of said disk, a center-structure comprising layers of fabric impregnated with a binder and of polygonal form, with spaces between said center-structure and said annulus, and molding compound in said spaces, the whole consolidated under heat and pressure.

4. A gear as specified in claim 3, in which the polygonal layers of the center-structure have not more than four edges.

5. A gear comprising a compacted, hardened structure and comprising an annulus composed of layers of fabric and a binder, a center-structure comprising layers of polygonal sheets of fabric and a binder, with spaces between the annulus and the center-structure, and a moulding compound in said spaces, the whole consolidated under heat and pressure.

ROBERT W. LYTLE.